United States Patent

Klauck et al.

(10) Patent No.: US 6,617,385 B1
(45) Date of Patent: Sep. 9, 2003

(54) CYANACRYLATE ADHESIVE WITH ESTER AND POLYMER ADDITIVES

(75) Inventors: Wolfgang Klauck, Meerbusch (DE); Johann Klein, Duesseldorf (DE); Lydia Duhm, Duesseldorf (DE); Wolfgang Maier, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/555,353

(22) PCT Filed: Nov. 19, 1998

(86) PCT No.: PCT/EP98/07441

§ 371 (c)(1),
(2), (4) Date: Jul. 26, 2000

(87) PCT Pub. No.: WO99/28399

PCT Pub. Date: Jun. 10, 1999

(30) Foreign Application Priority Data

Nov. 28, 1997 (DE) .......................... 197 52 893

(51) Int. Cl.[7] .................................. C08K 5/11
(52) U.S. Cl. ................ 524/314; 524/315; 524/533; 524/555; 524/563
(58) Field of Search ............................... 524/563, 314, 524/315, 533, 555

(56) References Cited

U.S. PATENT DOCUMENTS

| 3,254,111 | A | * | 5/1966 | Hawkins et al. ............. 558/381 |
| 3,654,340 | A | * | 4/1972 | Banitt ......................... 558/372 |
| 4,444,933 | A | * | 4/1984 | Columbus et al. .......... 524/292 |
| 5,536,799 | A | * | 7/1996 | Takahashi et al. .......... 526/298 |
| 6,161,202 | A | * | 12/2000 | Kuntzsch et al. ............ 714/51 |
| 6,191,202 | B1 | * | 2/2001 | Greff et al. |

FOREIGN PATENT DOCUMENTS

| DE | 4317886 | * | 5/1993 |
| DE | 19621850 | * | 5/1996 |
| GB | 2268503 | * | 12/1994 |
| SU | 607573 | * | 4/1978 |

* cited by examiner

*Primary Examiner*—Bernard Lipman
(74) *Attorney, Agent, or Firm*—Stephen D. Harper; Michael E. Carmen

(57) ABSTRACT

A cyanoacrylate adhesive contains an added ester, the ester used being at least one partial and/or full ester of monobasic or polybasic aliphatic carboxylic acids containing 1 to 5 carbon atoms directly attached to one another and monohydric to pentahydric aliphatic alcohols containing 1 to 5 carbon atoms directly attached to one another, the number of carbon atoms directly attached to one another in the other aliphatic groups being at most three where one aliphatic group contains 4 or 5 carbon atoms.

6 Claims, No Drawings

CYANACRYLATE ADHESIVE WITH ESTER AND POLYMER ADDITIVES

This invention relates to a cyanoacrylate adhesive containing an ester as plasticizer.

Cyanoacrylate adhesives containing an ester as plasticizer are known. Thus, according to DE 34 00 577, up to 25% by weight of a plasticizer is added in addition to 4 to 30% by weight of a vinyl chloride/vinyl acetate copolymer. This plasticizer is an ester of an aromatic monocarboxylic or dicarboxylic acid and a monohydroxy or polyhydroxy compound. According to the document in question, neither the cure rate of the adhesive nor the quality of the bond during curing is significantly affected by the addition of this aromatic plasticizer. However, when these tests were re-run, it was found that the cure rate was clearly reduced. Thus, the setting rate of ethyl cyanoacrylate on EPDM, for example, is slowed from 5 seconds to 35 seconds by a 30% addition of butyl benzyl phthalate.

According to DE 43 17 886 also, the following esters are added to cyanoacrylate adhesives to reduce adhesion to the skin:
1. Aliphatic carboxylic acid esters containing an aliphatic group in which 6 or more carbon atoms are directly attached to one another.
2. Aliphatic carboxylic acid esters containing at least two aliphatic groups in which 4 or more carbon atoms are directly attached to one another.
3. Carboxylic acid esters of a carbocyclic compound which, in a carboxylic acid residue or an alcohol residue, contains an aliphatic group in which 5 or more carbon atoms are directly attached to one another.

The cyanoacrylate adhesives additionally contain polymerization accelerators.

The problem addressed by the present invention was to obviate the disadvantages of known plasticizer-containing cyanoacrylate adhesives and, in particular, to provide a cyanoacrylate adhesive characterized by high stability in storage, useful strength values and virtually the same setting rates.

The solution provided by the invention is defined in the claims and consists essentially in using 1 to 60% by weight of a polymer, based on the adhesive as a whole, in addition to at least one partial and/or full ester of a monobasic or polybasic aliphatic carboxylic acid containing 1 to 5 carbon atoms directly attached to one another and monohydric to pentahydric aliphatic alcohols containing 1 to 5 carbon atoms directly attached to one another, the number of carbon atoms directly attached to one another in the other aliphatic groups being at most 3 where one aliphatic group contains 4 or 5 carbon atoms directly attached to one another.

The alcohol component of the ester is preferably an alcohol containing 1 to 5 and, more particularly, 2 to 4 OH groups and 2 to 5 and, more particularly, 3 or 4 carbon atoms directly attached to one another. The number of carbon atoms not directly attached to one another may be up to 110 and, more particularly, up to 18 carbon atoms.

Examples of monohydric alcohols are methanol, ethanol, 1-propanol, 2-propanol, 1-butanol, 2-butanol, 2,2-dimethyl-1-propanol, 2-methyl-1-propanol, 2,2-dimethyl-1-propanol, 2-methyl-2-propanol, 2-methyl-1-butanol, 3-methyl-1-butanol, 2-methyl-2-butanol, 3-methyl-2-butanol, 1-pentanol, 2-pentanol, 3-pentanol, cyclopentanol, cyclopentenol, glycidol, tetrahydrofurfuryl alcohol, tetrahydro-2H-pyran4-ol, 2-methyl-3-buten-2-ol, 3-methyl-2-buten-2-ol, 3-methyl-3-buten-2-ol, 1-cyclopropyl ethanol, 1-penten-3-ol, 3-penten-2-ol, 4-penten-1-ol, 4-penten-2-ol, 3-pentin-1-ol, 4-pentin-1-ol, propargyl alcohol, allyl alcohol, hydroxyacetone, 2-methyl-3-butin-2-ol.

Examples of dihydric alcohols are ethane-1,2-diol, propane-1,2-diol, propane-1,3-diol, dihydroxyacetone, thioglycerol, 2-methylpropane-1,3-diol, 2-butine-1,4-diol, 3-butene-1,2-diol, butane-2,3-diol, butane-1,4-diol, butane-1,3-diol, butane-1,2-diol, 2-butene-1,4-diol, 1,2-cyclopentane diol, 3-methylbutane-1,3-diol, 2,2-dimethylpropane-1,3-diol, 4-cyclopentene-1,3-diol, 1,2-yclopentane diol, 2,2-dimethylpropane-1,3-diol, pentane-1,2-diol, pentane-2,4-diol, pentane-1,5-diol, 4-cyclopentene-1,3-diol, 2-methylenepropane-1,3-diol, 2,3-dihydroxy-1,4-dioxane, 2,5-dihydroxy-1,4-dithiane.

Examples of trihydric alcohols are glycerol, erythrulose, butane-1,2,4-triol, erythrose, threose, trimethylolethane, trimethylolpropane and 2-hydroxymethylpropane-1,3-diol.

Examples of tetrahydric alcohols are erythritol, threitol, pentaerythritol, arabinose, ribose, xylose, ribulose, xylulose, lyxose, ascorbic acid, gluconic acid-γ-lactone.

Examples of pentahydric alcohols are arabitol, adonitol, xylitol.

In one particular embodiment of the invention, the polyhydric alcohols described above may be used in etherified form. The ethers may be prepared from the above-mentioned alcohols, for example by condensation reactions, Williamson's ether synthesis or by reaction with alkylene oxides, such as ethylene, propylene or butylene oxide. Examples include diethylene glycol, triethylene glycol, polyethylene glycol, diglycerol, triglycerol, tetraglycerol, pentaglycerol, polyglycerol, technical mixtures of the condensation products of glycerol, glycerol propoxylate, diglycerol propoxylate, pentaerythritol ethoxylate, dipentaerythritol, ethylene glycol monobutyl ether, propylene glycol monohexyl ether, butyl diglycol, dipropylene glycol monomethyl ether.

Monobasic carboxylic acids which may be used for the esterification reaction with the alcohols mentioned above include formic acid, acrylic acid, acetic acid, propionic acid, butyric acid, isobutyric acid, valeric acid, isovaleric acid, 2-oxovaleric acid, 3-oxovaleric acid, pivalic acid, acetoacetic acid, levulinic acid, 3-methyl-2-oxobutyric acid, propiolic acid, tetrahydrofuran-2-carboxylic acid, methoxyacetic acid, dimethoxyacetic acid, 2-(2-methoxyethoxy)-acetic acid, 2-methyl acetic acid, pyruvic acid, 2-methoxyethanol, vinyl acetic acid, allyl acetic acid, 2-pentenoic acid, 3-pentenoic acid, tetrahydrofuran-2-carboxylic acid.

Examples of polybasic carboxylic acids include oxalic acid, malonic acid, fumaric acid, maleic acid, succinic acid, glutaric acid, acetylene dicarboxylic acid, oxaloacetic acid, acetone dicarboxylic acid, mesoxalic acid, citraconic acid, dimethyl malonic acid, methyl malonic acid, ethyl malonic acid.

Other suitable starting materials are hydroxycarboxylic acids, for example tartronic acid, lactic acid, malic acid, tartaric acid, citramalic acid, 2-hydroxyvaleric acid, 3-hydroxyvaleric acid, 3-hydroxybutyric acid, 3-hydroxyglutaric acid, dihydroxyfumaric acid, 2,2-dimethyl-3-hydroxypropionic acid, dimethylolpropionic acid, glycolic acid.

The esterification may be either complete or partial. Mixtures of the above-mentioned acids may optionally be used for the esterification.

The esters to be used in accordance with the invention prepared from the above-mentioned alcohols and carboxylic acids or the corresponding derivatives are preferably free from catalysts, more particularly alkali metals and amines. This can be achieved by treating the esters according to the invention with acids, ion exchangers, acetic acid clays, aluminium oxides, active carbon or other auxiliaries known to the expert. The esters may be dried and further purified by overhead distillation.

Examples of the esters according to the invention include ethyl acetate, butyl acetate, glycerol triacetate, glycerol tripropionate, triglycerol pentaacetate, polyglycerol acetate, diethylene glycol diacetate, 3-hydroxyvaleric acid ethyl ester, lactic acid butyl ester, lactic acid isobutyl ester, 3-hydroxybutyric acid ethyl ester, oxalic acid diethyl ester, mesoxalic acid diethyl ester, malic acid dimethyl ester, malic acid diisopropyl ester, tartaric acid diethyl ester, tartaric acid dipropyl ester, tartaric acid diisopropyl ester, glutaric acid dimethyl ester, succinic acid dimethyl ester, succinic acid diethyl ester, maleic acid diethyl ester, fumaric acid diethyl ester, malonic acid diethyl ester, acrylic acid-2-hydroxyethyl ester, 3-oxovaleric acid methyl ester, glycerol diacetate, glycerol tributyrate, glycerol tripropionate, glycerol dipropionate, glycerol triisobutyrate, glycerol diisobutyrate, glycidyl butyrate, acetoacetic acid butyl ester, levulinic acid ethyl ester, 3-hydroxyglutaric acid dimethyl ester, glycerol acetate dipropionate, glycerol diacetate butyrate, propiolic acid butyl ester, propylene glycol diacetate, propylene glycol dibutyrate, diethylene glycol dibutyrate, trimethylol ethane triacetate, trimethylol propane triacetate, trimethylol ethane tributyrate, neopentyl alcohol dibutyrate, methoxyacetic acid pentyl ester, dimethoxyacetic acid butyl ester, glycolic acid butyl ester.

The boiling point of the esters according to the invention is preferably above 180° C. and more preferably above 200° C. at normal pressure.

The esters according to the invention are added in a quantity of up to 50% by weight and preferably in a quantity of 1 to 30% by weight, based on the adhesive as a whole. Beyond a concentration of 30 and, more particularly, 40% by weight, the polycyanoacrylates show contact-adhesive properties.

The cyanoacrylate adhesives are essentially based on typical monocyanoacrylic acid esters and/or biscyanoacrylates.

"Typical monocyanoacrylic acid esters" in the context of the invention are understood to be compounds corresponding to general formula (I):

$$H_2C=C(CN)-CO-O-R \tag{I}$$

where R is an alkyl, alkenyl, cycloalkyl, aryl, alkoxyalkyl, aralkyl or haloalkyl group, more especially a methyl, ethyl, n-propyl, isopropyl, n-butyl, isobutyl, pentyl, hexyl, allyl, methallyl, crotyl, propargyl, cyclohexyl, benzyl, phenyl, cresyl, 2-chloroethyl, 3-chloropropyl, 2-chlorobutyl, trifluoroethyl, 2-methoxyethyl, 3-methoxybutyl and 2-ethoxyethyl group. The cyanoacrylates mentioned above are known to the expert on adhesives, cf. Ullmann's Encyclopedia of Industrial Chemistry, Vol. A1, page 240, Verlag Chemie Weinheim (1985), U.S. Pat. Nos. 3,254,111 and 3,654,340. Preferred monomers are the allyl, methoxyethyl, ethoxyethyl, methyl, ethyl, propyl, isopropyl or butyl esters of 2-cyanoacrylic acid.

"Biscyanoacrylates" are compounds corresponding to general formula (II):

$$[H_2C=C(CN)-CO-O]_2R^1 \tag{II}$$

where $R^1$ is a branched or unbranched difunctional alkane group containing 2 to 18 and, more particularly, 6 to 12 carbon atoms which may also contain hetero atoms, such as halogens and oxygen, or aliphatic or aromatic rings. However, $R^1$ is preferably a pure hydrocarbon. It is important that the biscyanoacrylates be particularly pure. This requirement is satisfied, for example, by the following production and purification methods: essentially, monocyanoacrylates are transesterified with diols and the reaction mixtures are subsequently worked up by fractional crystallization.

Accordingly, a suitable process for the production of biscyanoacrylates comprises transesterifying 2-cyanoacrylic acid or an alkyl ester thereof corresponding to general formula (III):

$$H_2C=C(CN)-CO-O-R^2 \tag{III}$$

where $R^2$ is a branched or unbranched alkyl group containing 1 to 6 carbon atoms,
with diols corresponding to general formula (IV):

$$[HO]_2R^1 \tag{IV}$$

where $R^1$ is a branched or unbranched difunctional alkane group containing 2 to 18 carbon atoms, which may also contain hetero atoms, such as halogens and oxygen, or aliphatic or aromatic rings,
to form biscyanoacrylates corresponding to general formula II and then purifying the reaction mixture by fractional crystallization.

Accordingly, one starting product is a monofunctional cyanoacrylic acid corresponding to formula III or an alkyl ester thereof. The alkyl group should be selected so that the alcohol formed can be easily removed. Suitable possibilities are known to the expert from the general transesterification reaction. The alcohol is preferably removed by distillation. Accordingly, $R^2$ is a branched or unbranched alcohol radical containing 1 to 6 carbon atoms, preferably 1 or 2 carbon atoms. The monofunctional cyanoacrylic acid ester is stabilized in the usual way.

The diols (formula IV) are dihydric primary or secondary alcohols, preferably primary alcohols. The hydroxyl groups may be in any position to one another, although they are preferably in the alpha/omega position. The diols contain 2 to 18 carbon atoms and preferably 6 to 12 carbon atoms. They may be in a linear, branched or cyclic arrangement. The aliphatic radical may also contain an aromatic group or, besides the hydrogen and carbon atoms, hetero atoms such as, for example, chlorine or oxygen atoms, preferably in the form of polyethylene or polypropylene glycol units. Hexane diol, octane diol, decane diol and dodecane diol are specifically mentioned as diols.

The cyanoacrylic acid ester is used in excess. Accordingly, the molar ratio of monofunctional cyanoacrylic acid ester to diol is at least 2.0:1.0, preferably 2.5:1.0 and, more preferably, 2.2:1.0.

The transesterification is catalyzed by strong acids, more especially sulfonic acids and preferably aromatic sulfonic acids such as, for example, p-toluene sulfonic acid. However, naphthalene sulfonic acid, benzene sulfonic acid and acidic ion exchangers may also be used. The concentration of the transesterification catalyst should be between 1 and 20% by weight, based on the monofunctional cyanoacrylate.

The transesterification reaction is carried out in solution, as is normally the case. Suitable solvents are aromatic hydrocarbons and halogenated hydrocarbons. Preferred solvents are toluene and xylene. The concentration of the solution is 10 to 50% and preferably 10 to 20%.

The monohydric alcohol formed and the water formed are removed in known manner and, preferably, distilled off with the solvent. The conversion of the transesterification reaction is monitored, for example, from NMR spectra. The reaction takes several hours, as is normally the case. Where toluene is used as the solvent and p-toluene sulfonic acid as the catalyst, the reaction is terminated after 10 to 15 hours when there is no further separation of alcohol.

The working up of the reaction mixture is very important. Where acidic ion exchangers are used as the catalyst, they may be simply filtered off. Where soluble sulfonic acids, for example p-toluene sulfonic acid, are used as the catalyst, they are removed by solvent substitution: toluene is replaced by a mixture of hexane, heptane or decane. Pure biscyanoacrylate is obtained after two fractional crystallizations. According to NMR spectra, it has a purity of more than 99%.

The biscyanoacrylate obtained is stable in storage with the usual stabilizers and in the usual concentrations, i.e. there is hardly any change in its melting point after storage for 6 months at 20° C.

However, the biscyanoacrylates obtained polymerize very quickly in the presence of bases, preferably at substantially the same rate as the corresponding monocyanoacrylates. As with the monofunctional cyano-acrylates, traces of water are sufficient. A three-dimensionally crosslinked polymer with relatively good thermal properties is formed.

According to the invention, therefore, it is used in known cyanoacrylate adhesives in a quantity of 0.5 to 50% by weight, preferably 1 to 10% by weight and more preferably 2 to 5% by weight, based on the adhesive as a whole.

Besides the plasticizer according to the invention, the adhesive may contain other additives, for example other plasticizers, thickeners, stabilizers, activators, dyes and accelerators, for example polyethylene glycol or cyclodextrin and polymers.

The polymers may be used in a quantity of 1 to 60% by weight, preferably 10 to 50% by weight and more preferably 10 to 30% by weight, based on the formulation as a whole. Suitable polymers are, above all, polymers based on vinyl esters, vinyl ethers, esters of acrylic acid and methacrylic acid, styrene and copolymers and terpolymers derived therefrom with ethene, butadiene. The polymers may be present in liquid, resin-like or even solid form. It is particularly important that the polymers contain no impurities from the polymerization process which could inhibit curing of the cyanoacrylate. If the polymers have an excessive water content, they may have to be dried. Their molecular weight may be scattered over a broad range although the Mw value should be at least 1,500 and at most 1,000,000 because otherwise the final viscosity of the adhesive formulation will be too high. Mixtures of the above-mentioned polymers may also be used. More particularly, a combination of low molecular weight and high molecular weight products has particular advantages in regard to the final viscosity of the adhesive formulation. Examples of suitable polymers based on vinyl acetate include Mowilith types 20, 30 and 60 and Vinnapas types B1.5, B100, B17, B5, B500/20VL, B60, UW10, UW1, UW30, UW4 and UW50. Examples of suitable acrylate-based polymers are Acronal 4F and Laromer types 8912, PE55F and PO33F. Examples of suitable methacrylate-based polymers include Elvacite 2042, Neocryl types B 724, B999 731, B 735, B 811, B 813, B 817 and B722, Plexidon MW 134, Plexigum types M 825, M 527, N 742, N 80, P 24, P28 and PQ 610. An example of a suitable vinyl ether-based polymer is Lutonal A25.

The adhesive is prepared in the usual way by mixing the individual components. In all the cases investigated, the stability of the new adhesives in storage was more than 1 year at room temperature or more than 10 days at 80° C.

The cure rate is hardly affected by the plasticizer according to the invention, i.e. it is preferably not doubled and barely exceeds 1 minute in the case of EPDM.

The new cyanoacrylate adhesive according to the invention is particularly suitable for bonding, above all, rubber, metals, wood, ceramics, china, paperboard, paper, cork and plastics other than PE, PP and Teflon and Styropor.

The invention is illustrated by the following Examples.

In order to obtain a comprehensive overview of the changes which the properties of the cyanoacrylates undergo as a result of the addition of plasticizers according to the invention, mixtures of basically stabilized pure ester and mixtures of glycerol triacetate (triacetin) or ethyl acetate in combination with various polymers in the range from 0 to 40% by weight (additives as a whole) were prepared. The basic stabilization consists of hydroquinone (400 to 1,000 ppm) and $SO_2$ (5 to 15 ppm). The samples were homogenized for 6 days in a shaking machine and then measured.

EXAMPLE

The results (viscosity, setting times, strengths) for ester type AE (AE=ethyl ester) in combination with a mixture of plasticizing esters and various polymers are shown in the following Table. The polymers are:

Vinnapas UW 1=polyvinyl acetate

Vinnapas B 1.5=polyvinyl acetate with an osmotic degree of polymerization of 100

Vinnapas B 5=polyvinyl acetate with an osmotic degree of polymerization of 150

Vinnapas UW 50=polyvinyl acetate with an osmotic degree of polymerization of 3400 and Vinnapas B 100=vinyl acetate/vinyl laurate copolymer with a degree of polymerization of 600

TABLE 1

Influence of the plasticizers triacetin and ethyl acetate containing added polyvinyl acetate on the viscosity, setting times and strengths of the ethyl ester of cyanoacrylic acid
MF = material failure

| Example | Addition | Ester | Quantity [%] | Viscosity [mPas] | 10 d/80° C. | Setting time[s] EPDM | Strengths [N/mm$^2$] Alu | PVC |
|---|---|---|---|---|---|---|---|---|
| 1a | Triacetin | AE | 10 | 1019 | 6371 | 10–12 | 14.1 | 6.1 MF |
|  | Vinnapas UW 1 |  | 20 |  |  |  |  |  |
| 1b | Triacetin | AE | 10 | 11.6 | 351 | 4–5 | 15.1 | 5.5 MF |
|  | Vinnapas B 1.5 |  | 10 |  |  |  |  |  |
| 1c | Triacetin | AE | 10 | 63.5 | 537 | 11–13 | 16.3 | 5.3 MF |
|  | Vinnapas B 5 |  | 20 |  |  |  |  |  |

TABLE 1-continued

Influence of the plasticizers triacetin and ethyl acetate containing added polyvinyl acetate on the viscosity, setting times and strengths of the ethyl ester of cyanoacrylic acid
MF = material failure

| Example | Addition | Ester | Quantity [%] | Viscosity [mPas] | | Setting time[s] EPDM | Strengths [N/mm²] | |
|---|---|---|---|---|---|---|---|---|
| | | | | | 10 d/80° C. | | Alu | PVC |
| 1d | Triacetin | AE | 10 | 1375 | 1838 | 6–8 | 12.5 | 9.4 MF |
| | Vinnapas UW 50 | | 10 | | | | | |
| 1e | Ethyl acetate | AE | 10 | 839 | 1122 | 10–12 | 13 | 7.0 MF |
| | Vinnapas B 100 | | 30 | | | | | |

According to the Table, the viscosities are dramatically increased by the addition of the plasticizers according to the invention in combination with various polymers. Although the viscosities rise after the accelerated storage test (10 days/80° C. in PE bottles), they do indicate adequate stability in storage. The strengths on aluminium and PVC are surprisingly higher than in the case of pure AE.

The tests were based on the following methods:
1. Viscosity was determined as follows:
   cone/plate measuring system, viscosity at 20±1° C.
2. The setting time of all adhesive compositions was determined as follows at 20±1° C. for the materials:
   EPDM: A round solid rubber cord (diameter 13 mm) of ethylene/propylene terpolymer (EPDM) was freshly cut. 1 to 2 drops of adhesive were applied to the surface and the ends of the rubber cord were immediately joined together. The setting time is the time to material failure.
   Aluminium: The time at which two freshly cleaned and bonded aluminium tubes (A=0.5 cm²) showed a measurable resistance to displacement was determined.
   PVC: The time at which two cleaned (degreased) PVC strips (measuring 100×25×4 mm), which were bonded with a 10 mm overlap, no longer adhered to one another over the bonded areas after separation was determined.
3. Tensile shear strengths were determined as follows:
   The test specimens were 100×25×1.5 mm large, the overlap was 10 mm and the bonded area 250 mm².
   Sheet aluminium was cleaned and sand-blasted, the PVC was only cleaned (degreased).
   Five bonding cycles were carried out, the results being expressed as the mean value. The test conditions were as follows:
   The tensile testing machine operated with an advance of 10 mm/min. Curing was carried out over a period of 6 days at 22° C./40% relative air humidity (standard climatic conditions).

What is claimed is:
1. An adhesive composition comprising
   (a) a biscyanoacrylate of the general formula:

$$[H_2C=C(CN)-CO-O]_2R^1 \quad (I)$$

wherein $R^1$ is a branched or unbranched difunctional alkane group containing 2 to 18 carbon atoms optionally containing hetero atoms or aliphatic rings or aromatic rings;
   (b) a polymer selected from the group consisting of polyvinyl esters, polyvinyl ethers, polyesters of acrylic acid, polyesters of methacrylic acid, styrene, copolymers thereof, terpolymers thereof and mixtures thereof; and,
   (c) an added ester, the ester being at least one partial and/or full ester of monobasic or polybasic aliphatic carboxylic acids containing 1 to 5 carbon atoms directly attached to one another, and monohydric to pentahydric aliphatic alcohols containing 1 to 5 carbon atoms directly attached to one another, the number of carbon atoms directly attached to one another in the aliphatic groups of the acid being at most three where the aliphatic group of the alcohol contains 4 or 5 carbon atoms and the number of carbon atoms directly attached to one another in the aliphatic group of the alcohol being at most three where the aliphatic group of the acid contains 4 or 5 carbon atoms, wherein the adhesive has a polymer content of 1 to 60% by weight, based on the adhesive as a whole.
2. The adhesive composition of claim 1 wherein the biscyanoacrylate is obtained from the reaction of a compound of the general formula $$H_2C=C(CN)-CO-O-R^2 \quad (II)$$

wherein $R^2$ is hydrogen or a branched or unbranched alkyl group having 1 to 6 carbon atoms with a diol of the general formula $$[HO]_2R^3 \quad (III)$$

wherein $R^3$ is a branched or unbranched difunctional alkane group containing 2 to 18 carbon atoms.
3. The adhesive composition of claim 1 wherein the molar ratio of the compound of formula II to the diol of formula III is 2.0:1.0.
4. The adhesive composition of claim 1 wherein the biscyanoacrylate is present in an amount of 0.5 to 50% by weight based on the adhesive as a whole.
5. The adhesive composition of claim 1 wherein the added ester is selected from the group consisting of triacetin and diacetin.
6. The adhesive composition of claim 1 wherein the added ester is present in an amount up to 50% by weight based on the adhesive as a whole.

* * * * *

UNITED STATES PATENT AND TRADEMARK OFFICE
CERTIFICATE OF CORRECTION

PATENT NO. : 6,617,385 B1
DATED : September 9, 2003
INVENTOR(S) : Klauck et al.

It is certified that error appears in the above-identified patent and that said Letters Patent is hereby corrected as shown below:

Column 8,
Lines 16-21, delete the paragraph beginning with "(b)" in its entirety and substitute the paragraph:
-- (b) a polymer selected from the group consisting of polymers based on vinyl esters, vinyl ethers, esters of acrylic acid and methacrylic acid, styrene and copolymers and terpolymers derived therefrom and mixtures thereof, and, --.
Line 49, delete "claim 1" and insert therefore -- claim 2 --.

Signed and Sealed this

Twelfth Day of October, 2004

JON W. DUDAS
*Director of the United States Patent and Trademark Office*